United States Patent
Lee et al.

(10) Patent No.: US 6,690,871 B2
(45) Date of Patent: Feb. 10, 2004

(54) GRADED INDEX WAVEGUIDE

(75) Inventors: Kevin K. Lee, Cambridge, MA (US); Desmond Lim, Cambridge, MA (US); Kazumi Wada, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/893,263

(22) Filed: Jun. 27, 2001

(65) Prior Publication Data

US 2002/0021879 A1 Feb. 21, 2002

Related U.S. Application Data

(60) Provisional application No. 60/217,167, filed on Jul. 10, 2000.

(51) Int. Cl.⁷ .................................. G02B 6/10
(52) U.S. Cl. .................. 385/129; 385/124; 385/125; 385/126
(58) Field of Search .................. 385/123, 124, 385/125, 126, 129, 130, 131, 141, 142, 143, 144

(56) References Cited

U.S. PATENT DOCUMENTS

| | | | |
|---|---|---|---|
| 4,412,722 A | | 11/1983 | Carnevale et al. |
| 4,737,015 A | | 4/1988 | Ishida et al. |
| 4,743,083 A | | 5/1988 | Schimpe |
| 4,919,504 A | * | 4/1990 | Colas et al. ............ 350/96.12 |
| 4,961,197 A | * | 10/1990 | Tanaka et al. ............... 372/45 |
| 5,042,045 A | * | 8/1991 | Sato ............................ 372/46 |
| 5,075,743 A | | 12/1991 | Behfar-Rad |
| 5,119,460 A | * | 6/1992 | Bruce et al. ............... 385/142 |
| 5,159,603 A | | 10/1992 | Kim |
| 5,563,979 A | * | 10/1996 | Bruce et al. ............... 385/142 |
| 5,932,397 A | | 8/1999 | Mustacich |
| 5,982,799 A | * | 11/1999 | Bour et al. ................... 372/50 |
| 6,157,765 A | | 12/2000 | Bruce et al. |

FOREIGN PATENT DOCUMENTS

JP    04 226 094    8/1992

OTHER PUBLICATIONS

Augusciuk, Elzbieta, et al. *Precise Control of the Modal Number of the Low–Mode Channel Gradient Index Waveguides.*. SPIE vol. 2943, pp. 128–133, 1996.

Danko, Joseph J. and Danette P. Ryan–Howard. *Index Profile of Graded–Index Channel Waveguides.* Optical Society of America. Applied Optics, vol. 25 No. 9, pp. 1505–1507, May 1, 1986.

Chen, R.T. and R. Shih. *Graded Index Polymer Channel Waveguide Array for Backplane Optical Interconnects.* Non-conducting Photopolymers and Applications, SPIE vol. 1774, pp. 97–102, 1992.

"8–mW Threshold $Er^{3+}$–Doped Planar Waveguide Amplifier"; Ghosh et al., IEEE Photonics Technology Letters, vol. 8, No. 4, Apr. 1996; pp. 518–520.

* cited by examiner

*Primary Examiner*—John D. Lee
*Assistant Examiner*—Jennifer Doan
(74) *Attorney, Agent, or Firm*—Samuels, Gauthier & Stevens, LLP

(57) ABSTRACT

A planar waveguide that has a graded index layer at the core/cladding interface to reduce scattering losses due to core/cladding interface roughness. The refractive index at the core/cladding interface is changed from that of the core to that of cladding gradually by having a graded index layer. The graded index layer reduces the scattering of light traveling in the waveguide by reducing the effect of the roughness at the abrupt interface between the core and the cladding. Using a proper design, the graded index layer also minimizes the modal and polarization dispersion of the optical mode traveling in the waveguide.

31 Claims, 2 Drawing Sheets

GRADED INDEX WAVEGUIDE

PRIORITY INFORMATION

This application claims priority from provisional application Ser. No. 60/217,167 filed Jul. 10, 2000.

BACKGROUND OF THE INVENTION

The invention is in the field of optics, and specifically relates to optical waveguides.

Roughness scattering is one of the major sources of transmission loss in dielectric optical waveguides. The roughness at the core/cladding interface, where an abrupt change in the refractive index occurs, is responsible for such a scattering. It is particularly severe for high index difference (difference in the refractive indices between the core and the cladding) waveguides, since the scattering loss scales with index difference. The relationship between the scattering loss and the index difference can be found in Journal of Lightwave Technology 12, 790–796 (1994) by Suzuki et. al.

A high index difference waveguide typically has an index difference equal to or larger than 0.3 in a square channel waveguide configuration. A channel waveguide is a dielectric waveguide whose core is surrounded by a cladding that is composed of a material or materials with refractive indices lower than that of the core, and wherein the peak optical intensity resides in the core. High index difference waveguides can be defined in other waveguide geometries. In waveguide configurations that are difference from a channel waveguide, a high index difference waveguide is defined as one that has a mode-field size similar to that of a high index difference channel waveguide (within 50% difference in cross-sectional area). In these waveguides, a cladding is defined as a region where the evanescent field of optical modes exists.

Graded index waveguides are conventionally used in fiber optics to minimize modal dispersion. U.S. Pat. No. 4,412,722, issued to Carnevale et al. shows optical fiber waveguide with its index of refraction graded in the radial direction so as to yield low total dispersion. The index gradient is achieved by a diffusion process.

Grading the index at the core/cladding interfaces in planar waveguides is also shown in the prior art. Many publications including Applied Optics, Vol. 25, No. 9, May 1986 by Danko et. al. and Proceedings of SPIE, Vol. 2943 by Augusciuk et. al., show the fabrication of graded index channel waveguides by an ion-exchange process. In an ion-exchange process, the index of the waveguide core is raised above the waveguide cladding by inserting ions into the targeted region and annealing the waveguide to form a new chemical compound with a high refractive index than the previous material.

Proceedings of SPIE, Vol. 1774 by Shih et. al. shows a graded index waveguide that is formed by photolithography. A photo-sensitive polymer is used as the waveguide material that changes the index according to the intensity of the light that impinges on it.

In the prior art, waveguides are formed by methods of increasing the index of the targeted region, which becomes the waveguide core, over the rest. As a result of these methods, the index is graded from the core to the cladding.

SUMMARY OF THE INVENTION

The graded index waveguide of the invention reduces the effect of the core/cladding interface roughness on the scattering loss, therefore reducing the loss. By gradually changing the index at the core/cladding interface, the scattering loss is minimized, since the index jump from the core to the cladding is moderated by the presence of the graded index layer at the interface. The gradual index change at the interface results in the lower scattering loss since the mode traveling in the waveguide experiences less index difference at the core/cladding interfaces.

In accordance with one embodiment, the invention is a planar waveguide that has a graded index layer between the core and the cladding of a dielectric waveguide, created by either deposition, growth, or a chemical reaction, before the final cladding is put down. The graded index layer is created after the waveguide core is already formed. This is different from the prior arts where the graded index profile is automatically created when the waveguide core is being formed. In this invention, a graded index profile exists at the core/cladding interface, reducing the scattering losses due to interface roughness.

It is an object of the invention to minimize scattering loss by altering the abrupt index jump from that of the core to that of the cladding of a planar waveguide, by grading the index at the interface. Many index profiles at the waveguide core/cladding are possible for reduction of the waveguide loss. It is another object of the invention to show that such a graded index interface between the core and the cladding can be achieved by methods of adding materials such as thin film growth or deposition on the waveguide core. Such a graded index interface between the core and the cladding can be achieved by methods of altering materials such as a chemical reaction on the surface of the waveguide core. It is yet another object of the invention to minimize modal and polarization dispersion of a planar waveguide using the graded index design.

DETAILED DESCRIPTION OF THE INVENTION

Figure 1:
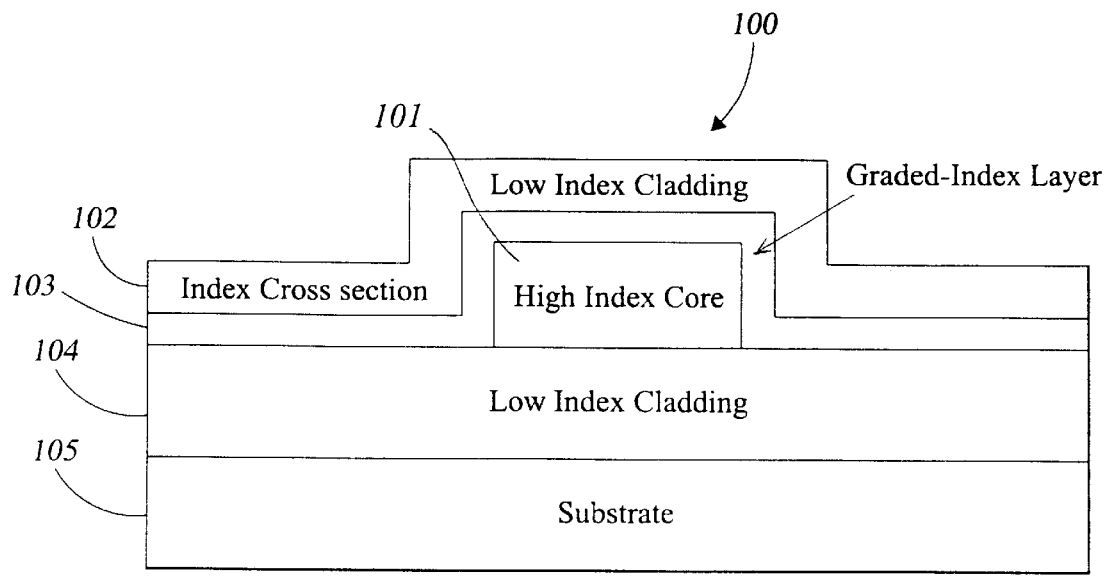
FIG. 1 is a cross-section view of an exemplary embodiment of a graded index planar waveguide in accordance with the invention.

FIG. 1 is a cross-section view of an exemplary embodiment of a graded index planar waveguide 100 in accordance with the invention. The waveguide includes a substrate for mechanical support, a first low index cladding 104, a high index core 101, a graded index layer 103 and a second low index cladding 102. The refractive index of the core 101, $n_1$, is larger than that of the claddings 102 and 104, $n_2$ and $n_4$. A unique feature of this waveguide is the presence of the graded index layer 103 between the core 101 and the cladding 102, whose index gradually varies from that of the high index core to that of the low index cladding. Scattering of light due to the rough interfaces between the core and the cladding is minimized since the index change from core to cladding is gradual.

Figure 2:
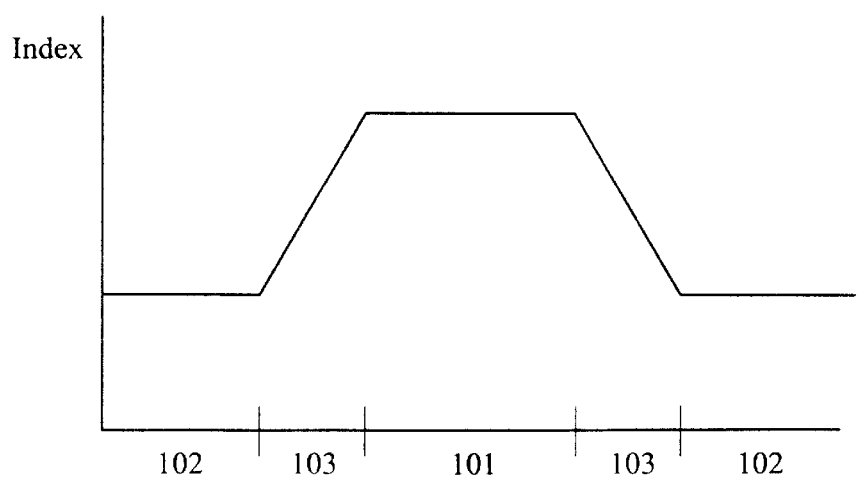
FIG. 2 is a graph of the index profile along the index cross-section shown in FIG. 1.

The index cross-section of the core, cladding, and the graded index layer in FIG. 1 is demonstrated in the graph of FIG. 2. The index profile of the graded index layer need not be linear, as shown in FIG. 2. The index in the core 101 is higher than that in the cladding 102. The index in the graded index layer is graded so that there is a less abrupt jump in index between the core and cladding. The index of the graded index layer can be changed between low and high index regions using any index profiles such as curves and staircase steps. Any profile that reduces the index jump from core to cladding at the interface will lower the scattering loss. The graded index layer should be designed so that the loss is optimally minimized. At the same time, the design should address the change in the confinement factor (how tightly light is confined in the waveguide core) due to the presence of the graded index layer, which will play a role in waveguide devices such as bends. A proper design of the graded index layer can also reduce modal and polarization dispersion.

An additional graded index layer can be inserted between the core 101 and the cladding 104 if the interface between them is rough. This layer will also make the waveguide look more symmetric, reducing polarization dispersion.

Figure 3:
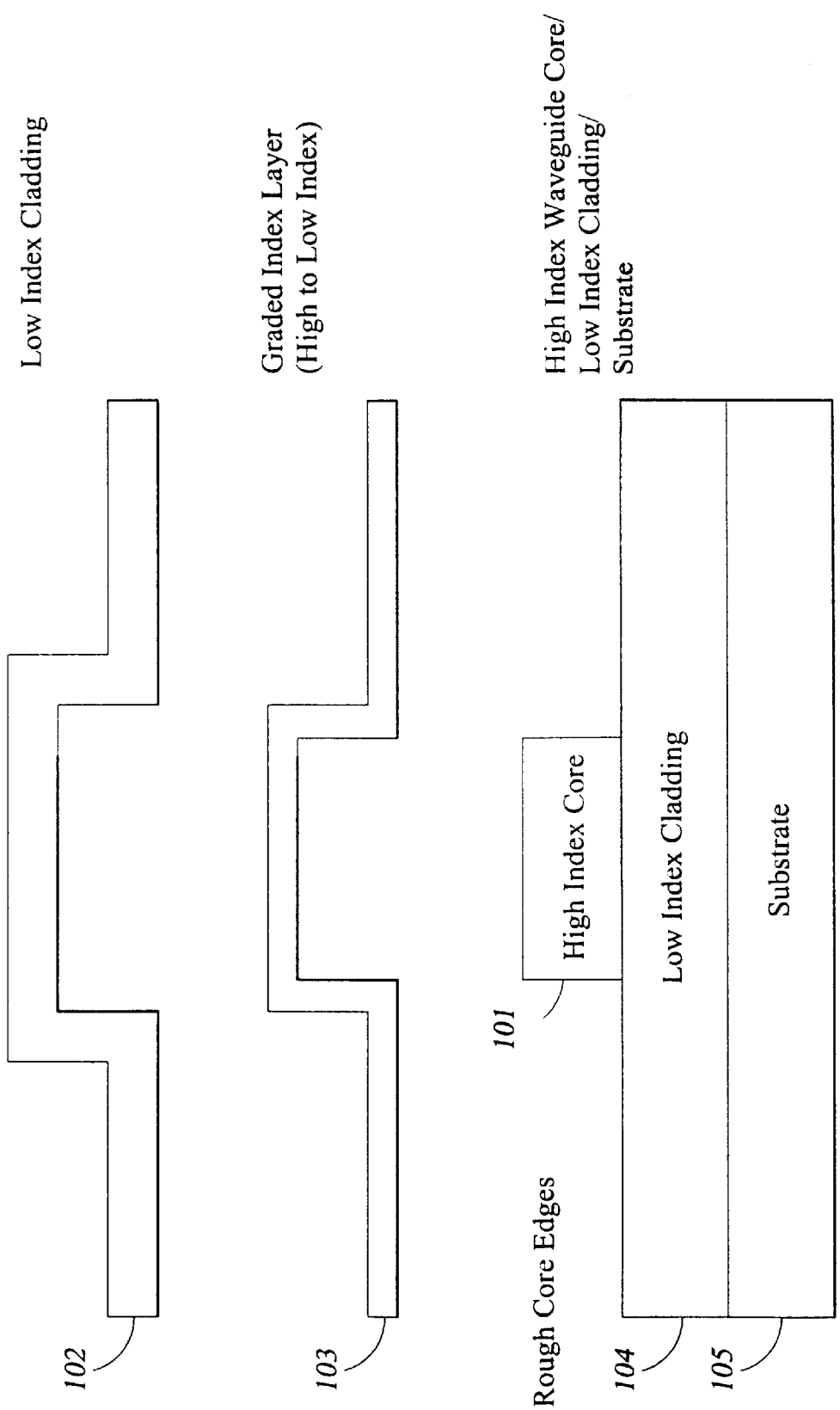
FIG. 3 is a diagram of the processing steps for fabricating a graded index waveguide using a thin film deposition technique in a accordance with the invention.

FIG. 3 is a diagram of an exemplary fabrication process of a graded index waveguide in accordance with the invention. The patterned waveguide core 101 has rough edges arising from the patterning techniques used. Thereafter, the graded index layer 103 is deposited. During the deposition process, the index of the layer is varied from that of core to that of cladding. The index grading can be achieved by varying the chemical composition of the layer. Finally, the cladding layer 102 is deposited on top.

Such a gradient in the index can also be obtained by a thin film growth method. During the growth process, the composition of the impinging material at the waveguide core surface can be changed to obtain an index gradient.

Another method of making graded index waveguide is to obtain a gradient in the atomic composition at the surface of the waveguide core from a chemical reaction. The composition of the waveguide core can be altered by chemical reactions that yield products that are transparent to the wavelength of interest, and has an index lower than that of the core. Since the concentration of the reactant of the chemical reactions is highest at the surface and decreases exponentially due to the diffusion of the reactant into the core material, there will be a concentration gradient of the product into the core material starting from the surface. The index near the surface will be graded according to the chemical composition gradient.

A graded index silicon nitride waveguide is an example of this type of waveguides. As shown in FIG. 1, the graded index layer in this case is a silicon oxynitride layer whose index varies from that of a silicon nitride core to that of a silicon dioxide cladding. The index change is achieved by changing the ratio of oxygen and nitrogen in silicon oxynitride layer. Deposition techniques such as chemical vapor deposition or sputtering can be used for depositing this layer.

A graded index germanium(Ge)/silicon(Si) waveguide is an example of a graded index waveguide obtained by a thin film growth technique. When germanium is the core material and silicon is the cladding material, $Si_xGe_{1-x}$ can be the graded index layer, whose index is graded during the growth process.

An example of obtaining a graded index layer using a chemical reaction can be illustrated with a waveguide whose core is silicon nitride and the cladding silicon dioxide. By subjecting patterned a silicon nitride waveguide core to oxidizing agents, a silicon oxynitride layer is formed at the surface. Since this process is controlled by diffusion of the oxidizing agents into the silicon nitride waveguide core, the concentration gradient of oxygen and nitrogen is created at the surface, with the surface having the highest level of oxygen. The concentration of oxygen decreases into the waveguide core while that of nitrogen increases.

Although the present invention has been shown and described with respect to several preferred embodiments thereof, various changes, omissions and additions to the form and detail thereof, may be made therein, without departing from the spirit and scope of the invention.

What is claimed is:

1. A dielectric waveguide comprising:
a first cladding layer on a substrate;
a core provided on said first cladding layer;
a graded index layer provided on said core; and
a second cladding layer provided on said graded index layer, wherein
said core and said cladding layers form a high index difference waveguide whose mode-field size is similar within 50% difference in area as a channel waveguide whose index difference is equal to or above 0.3.

2. The waveguide of claim 1, wherein said graded index layer is created separately from said core.

3. The waveguide of claim 1, wherein said core comprises a patterned layer.

4. The waveguide of claim 1, wherein said graded index layer reduces scattering loss.

5. The waveguide of claim 1, wherein said graded index layer reduces polarization or modal dispersion.

6. The waveguide of claim 1, wherein the refractive index of said graded index layer changes from that of said core to that of said second cladding layer in cross-section.

7. The waveguide of claim 1, wherein said graded index layer has a linear or a non-linear index profile in cross-section.

8. The waveguide of claim 1, wherein said graded index layer has a continuous or a segmented index profile in cross-section.

9. The waveguide of claim 1, wherein said graded index layer is created by methods of adding materials.

10. The waveguide of claim 9, wherein said graded index layer is created by thin film growth or deposition.

11. The waveguide of claim 1, wherein said graded index layer is created by methods of altering the chemical composition of materials.

12. The waveguide of claim 11, wherein said graded index layer is created by chemical reaction.

13. The waveguide of claim 1, wherein said first and second cladding layers comprise regions of materials that have lower refractive index than that of said core.

14. A waveguide of claim 1, wherein said core and said graded index layer comprise silicon and nitrogen in chemical composition.

15. The waveguide of claim 1, wherein said core and said graded index layer comprise germanium in chemical composition.

16. A planar dielectric waveguide, comprising:
a first cladding layer on a substrate;
a core provided on said first cladding layer;
a graded index layer provided on said core; and
a second cladding layer provided on said graded index layer, wherein
said core and said cladding layers form a high index difference waveguide whose mode-field size is similar within 50% difference in area as a channel waveguide whose index difference is equal to or above 0.3.

17. The waveguide of claim 16, wherein said graded index layer is created separately from said core.

18. The waveguide of claim 16, wherein said core comprises a patterned layer.

19. The waveguide of claim 16, wherein said graded index layer reduces scattering loss.

20. The waveguide of claim 16, wherein said graded index layer reduces polarization or modal dispersion.

21. The waveguide of claim 16, wherein the refractive index of said graded index layer changes from that of said core to that of said second cladding layer in cross-section.

22. The waveguide of claim 16, wherein said graded index layer has a linear or a non-linear index profile in cross-section.

23. The waveguide of claim 16, wherein said graded index layer has a continuous or a segmented index profile in cross-section.

24. The waveguide of claim 16, wherein said graded index layer is created by methods of adding materials.

25. The waveguide of claim 24, wherein said graded index layer is created by thin film growth or deposition.

26. The waveguide of claim 16, wherein said graded index layer is created by methods of altering the chemical composition of materials.

27. The waveguide of claim 26, wherein said graded index layer is created by chemical reaction.

28. The waveguide of claim 16, wherein said cladding layers comprise regions of materials that have lower refractive index than that of said core.

29. The waveguide of claim 16, wherein said core and said graded index layer comprise silicon and nitrogen in chemical composition.

30. The waveguide of claim 16, wherein said core and said graded index layer comprise germanium in chemical composition.

31. A method of fabricating a dielectric waveguide comprising:

providing a first cladding layer on a substrate;

providing a waveguide core on said first cladding layer;

providing a graded index layer on said core; and providing a second cladding layer on said graded index layer, wherein said core and said cladding layers form a high index difference waveguide whose mode-field size is similar within 50% difference in area as a channel waveguide whose index difference is equal to or above 0.3.

\* \* \* \* \*